United States Patent
Wilson (10) Patent No.: US 10,458,101 B2
(45) Date of Patent: Oct. 29, 2019

(54) EDGE WEAR PROTECTOR SYSTEM

(71) Applicant: MAKURI TECHNOLOGY PTE. LTD., Singapore (SG)

(72) Inventor: Ian James Wilson, Bali (ID)

(73) Assignee: Makuri Technology Pte. Ltd., Singapore (SG)

( * ) Notice: Subject to any disclaimer, the term of this patent is extended or adjusted under 35 U.S.C. 154(b) by 3 days.

(21) Appl. No.: 15/750,113

(22) PCT Filed: Aug. 2, 2017

(86) PCT No.: PCT/SG2017/050390
§ 371 (c)(1),
(2) Date: Feb. 2, 2018

(87) PCT Pub. No.: WO2019/027365
PCT Pub. Date: Feb. 7, 2019

(65) Prior Publication Data
US 2019/0040609 A1    Feb. 7, 2019

(51) Int. Cl.
*E02F 9/28* (2006.01)
*B23K 31/02* (2006.01)
*E02F 3/40* (2006.01)

(52) U.S. Cl.
CPC .......... *E02F 9/2883* (2013.01); *B23K 31/025* (2013.01); *E02F 3/40* (2013.01)

(58) Field of Classification Search
CPC ......... E02F 3/40; E02F 9/2883; B23K 31/025
See application file for complete search history.

(56) References Cited

U.S. PATENT DOCUMENTS 4,129,952 A    12/1978   Olson
5,564,508 A    10/1996   Renski
(Continued)

FOREIGN PATENT DOCUMENTS

AU    2010100656       7/2010
WO    WO 2012/159155   11/2012
WO    WO 2016/061609   4/2016

OTHER PUBLICATIONS

International Preliminary Report on Patentability for PCT/SG2017/050390 dated Nov. 28, 2017.

*Primary Examiner* — Tara Mayo-Pinnock
(74) *Attorney, Agent, or Firm* — Martin & Ferraro, LLP (57) ABSTRACT

The present invention provides an edge wear protector system adapted to be attached to a bucket of earth moving equipment, the bucket includes a base plate and a side plate connected to the base plate. The edge wear protector system includes a first member attachable to the base plate. First member includes an attaching side adapted to connect to the base plate when the first member is attached to the base plate, such that the first member includes a plug channel adapted to receive a plug weld therein and the plug channel is disposed on the attaching side of the first member. The edge wear protector includes a second member attachable to the side plate. Second member includes an attaching side adapted to connect to the side plate when the second member is attached to the side plate, such that the second member includes a plug channel adapted to receive a plug weld therein and the plug channel is disposed on the attaching side of the second member; and such that the first member is connectable to the second member.

10 Claims, 9 Drawing Sheets

(56) References Cited

U.S. PATENT DOCUMENTS

| | | | | |
|---|---|---|---|---|
| 9,027,266 B2 * | 5/2015 | Maher | ............... | E02F 9/285 37/444 |
| 9,371,631 B2 * | 6/2016 | Karlsson | ............... | E02F 9/2825 |
| 9,469,975 B2 * | 10/2016 | Sheehan | ............... | E02F 9/2883 |
| 9,995,021 B2 * | 6/2018 | Serrurier | ............... | E02F 9/2883 |
| 2013/0160335 A1 * | 6/2013 | Maher | ............... | E02F 9/285 37/453 |
| 2014/0173949 A1 * | 6/2014 | Karlsson | ............... | E02F 9/2825 37/455 |
| 2014/0373400 A1 * | 12/2014 | Sheehan | ............... | E02F 9/2883 37/403 |
| 2016/0130790 A1 * | 5/2016 | Serrurier | ............... | E02F 9/2883 37/450 |

* cited by examiner

EDGE WEAR PROTECTOR SYSTEM

This is a National Phase Application under 35 U.S.C. § 371 of PCT/SG2017/050390 filed Aug. 2, 2017; of which the contents are incorporated herein by reference in its entirety.

FIELD OF INVENTION

The present invention relates to an edge wear protector system adapted to be attached to bucket like structures as used in earth moving equipment.

BACKGROUND

Construction, quarry, and mining machines, such as shovels, excavators, loaders, stacker/reclaimers and draglines, of all types and configurations, make use of buckets of all types and configurations to dig, move and load materials. The maintenance and replacement costs for the buckets and the machines in general form a large part of the overall cost and profitability of the operation. Therefore, having a large degree of operating time, with the least amount of unplanned maintenance combined with low operating and capital replacement costs are all critical requirements for a successful operation.

Buckets can be subjected to extreme wear and structural stress from the abrasion and impacts experienced during the digging, moving and loading of materials. Therefore, the bucket structures and joints are protected against wear by use of special wear protector systems that come in a variety of forms. The side and adjacent bottom edges of a bucket are typically protected with edge protectors or what are more commonly called "Heel Shrouds" and sometimes "Heel Protectors", "Corner Protectors" or "Corner Wear Shoes", that wrap around and protect the structural corner joints of the bucket and are welded in place. Once worn out, the heel shrouds are removed and replaced.

The size and weight of the wear protectors affect the lifespan of the wear protectors. Understandably, the larger the wear protector, the better the structural strength and hence the longer its lifespan. However, the larger the wear protector, the heavier the bucket and the higher digging resistance created by the higher profile too. Typically, the wear protector is manufactured in low cost abrasion resistant cast steels and as a result, the wear protector wears out faster due to both its low hardness and larger profile. As such, more frequent replacements are required and all associated removal, replacements costs and downtime increase the operation costs.

Furthermore, as buckets have different types of joints, e.g. H-type, N-type and T-type, between a bucket base plate and side plates, there are many variations of wear protectors to accommodate each type of joints. Accordingly, there are varying bucket fabrication methods as well. Therefore, it is very difficult to create one type of wear protector to fit all styles. One way of overcoming this variation is to provide a larger than necessary wear protector so as to provide a large clearance at the corner joint area to accommodate the different types of joints. As mentioned, the larger wear protector results in a heavier bucket and higher digging resistance.

It is therefore an objective of the present invention to overcome the above disadvantages. Particularly, it would be beneficial for the present invention to be able to achieve better structural strength, fit all types of bucket joints and yet easy to fit and remove.

SUMMARY

According to various embodiments, the present invention provides an edge wear protector system adapted to be attached to a bucket of earth moving equipment, the bucket includes a base plate and a side plate connected to the base plate. The edge wear protector system includes a first member attachable to the base plate. First member includes an attaching side adapted to connect to the base plate when the first member is attached to the base plate, such that the first member includes a plug channel adapted to receive a plug weld therein and the plug channel is disposed on the attaching side of the first member. The edge wear protector includes a second member attachable to the side plate. Second member includes an attaching side adapted to connect to the side plate when the second member is attached to the side plate, such that the second member includes a plug channel adapted to receive a plug weld therein and the plug channel is disposed on the attaching side of the second member; and such that the first member is connectable to the second member.

According to various embodiments, the first member may include an opening adapted to provide access to the plug channel for the welding of the plug weld.

According to various embodiments, the opening may include a through hole.

According to various embodiments, the plug channel of the first member may be connected to the plug channel of the second member.

According to various embodiments, the second member may include a connecting side at an end of the second member, such that the connecting side may be adapted to be connected to the attaching side of the first member.

According to various embodiments, the plug channel of the second member may be disposed at the intersection of the attaching side and the connecting side of the second member.

According to various embodiments, the attaching side of the first member may include a step dividing the attaching side into a proximal portion adapted to be connected to the second member and a distal portion adapted to be connected to the base plate.

According to various embodiments, the plug channel of the first member may be disposed at the proximal portion of the attaching side of the first member.

According to various embodiments, the first member may include an edge surrounding the distal portion and a plug duct disposed along the edge of the distal portion, such that the plug duct is adapted to receive a plug weld therein.

According to various embodiments, the plug channel of the first member divides the attaching side of the first member into a first portion and a second portion, such that the first member may include an edge surrounding the second portion and a plug duct disposed along the edge of the second portion, such that the plug duct is adapted to receive a plug weld therein.

According to various embodiments, the attaching side of the second member may include a step dividing the attaching side into an upper portion adapted to be connected to the first member and a lower portion adapted to be connected to the side plate.

According to various embodiments, the second member may include an edge surrounding the lower portion and a plug duct disposed along the edge of the lower portion, such that the plug duct is adapted to receive a plug weld therein.

According to various embodiments, the first member may include an upper layer and a lower layer adapted to be connected to the base plate, such that the upper layer may be made from a material harder than the material of the lower layer.

According to various embodiments, the second member may include an outer layer and an inner layer adapted to be connected to the side plate, such that the outer layer may be made from a material harder than the material of the inner layer.

DETAILED DESCRIPTION

Figure 1:
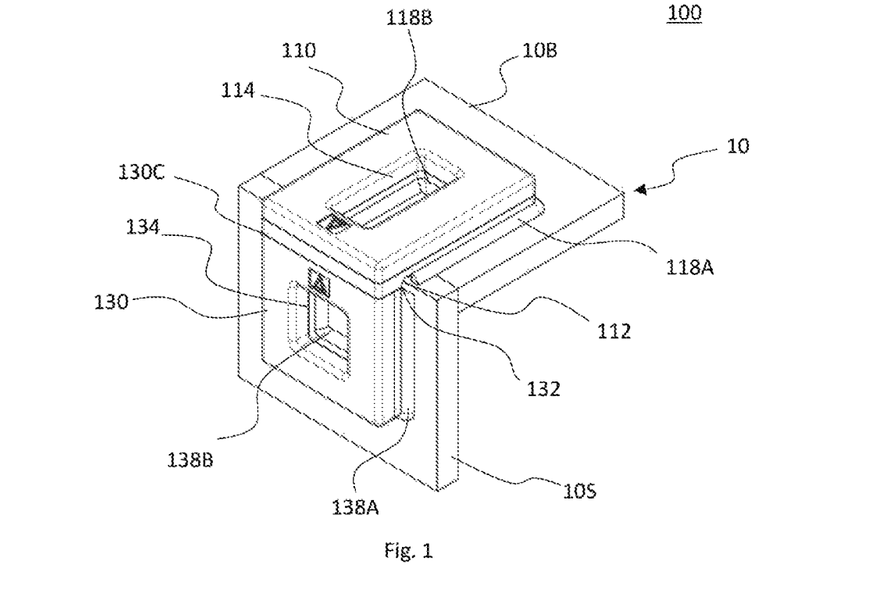
FIG. 1 shows an example of an edge wear protector adapted to be attachable to a bucket of an earth moving equipment.

FIG. 1 shows an example of a edge wear protector system 100 adapted to be attachable to a bucket 10 of a ground engaging tool. Bucket 10 includes a base plate 10B and a side plate 10S connected to the base plate 10B. Edge wear protector system 100 includes a first member 110 attachable to the base plate 10B. First member 110 includes an attaching side 110A (not shown in FIG. 1) adapted to connect to the base plate 10B when the first member 110 is attached to the base plate 10B, such that the first member 110 has a plug channel 112 adapted to receive a plug weld (not shown in FIG. 1) therein and the plug channel 112 is disposed on the attaching side 110A of the first member 110. Edge wear protector system 100 includes a second member 130 attachable to the side plate 10S. Second member 130 includes an attaching side 130A (not shown in FIG. 1) adapted to connect to the side plate 10S when the second member 130 is attached to the side plate 10S, such that the second member 130 includes a plug channel 132 adapted to receive a plug weld (not shown in FIG. 1) therein and the plug channel 132 is disposed on the attaching side 130A of the second member 130 such that the first member 110 is connectable to the second member 130.

Figure 17:
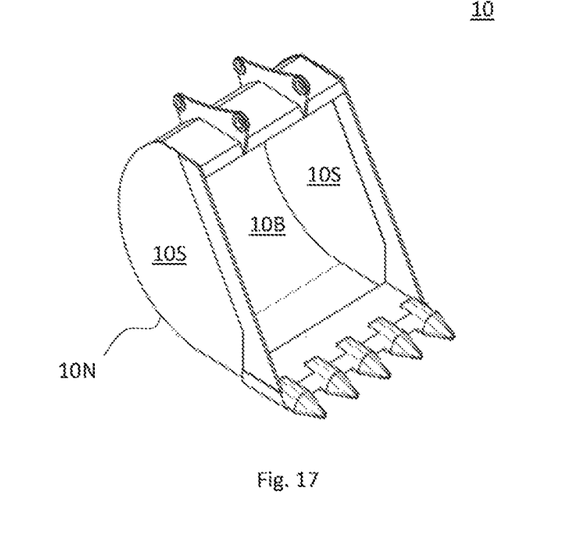
FIG. 17 shows an example of the bucket.
Figure 18A:
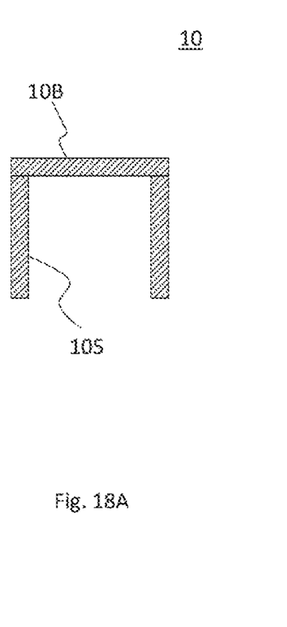
FIG. 18A-FIG. 18C show sectional views of different types of bucket.
Figure 18B:
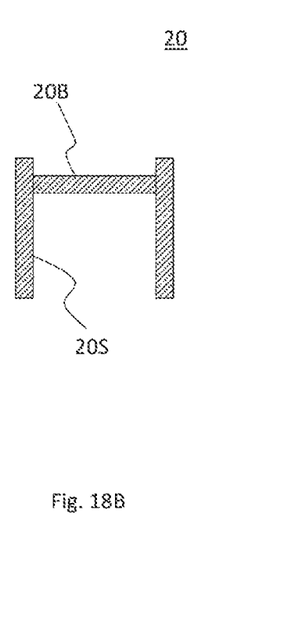
Figure 18C:
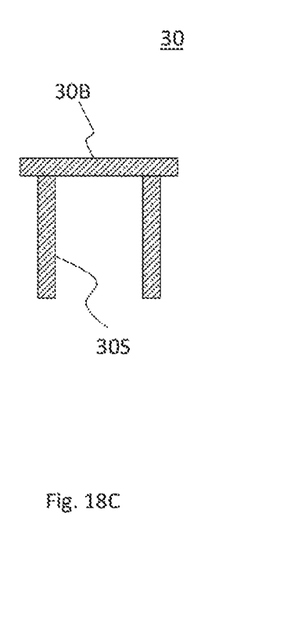

FIG. 17 shows an example of the bucket 10. Bucket 10 may include a base plate 10B that curves to form the base and back of the bucket 10. Bucket 10 may include a side plate 10S attached to each side of the base plate 10B. Edge wear protector system 100 may be attached to the joint 10N between the base plate 10B and the side plate 10S. FIG. 18A-FIG. 18C show sectional views of different types of buckets FIG. 18A shows a N-type bucket 10 where the base plate 10B meets the side plate 10S without either one protruding from the other. FIG. 18B shows a H-type bucket 20 where the side plate 20S protrudes beyond the base plate 20B. FIG. 18C shows a T-type bucket 30 where the base plate 30B protrudes beyond the side plate 30S. Base plate and side plates are welded to each other. Therefore, it is necessary to protect the joints where the plug welds are to prolong the lifespan of the bucket 30.

FIG. 1 shows a corner portion of an N-type bucket 10 where the base plate 10B and the side plate 10S of the bucket 10 are joined in such a way where the ends of both plates do not protrude beyond the other. Referring to FIG. 1, the first member 110 and the second member 130 may be welded to the bucket 10. Plug weld 118A may be welded onto the outer perimeter of the first member 110 and the base plate 10B. Plug weld 118B may be welded onto the perimeter of the opening 114 and the base plate 10B. Plug weld 138A may be welded onto the outer perimeter of the second member 130 and the side plate 10S. Plug weld 138B may be welded onto the perimeter of the through hole 134 and the side plate 10S.

Figure 2A:
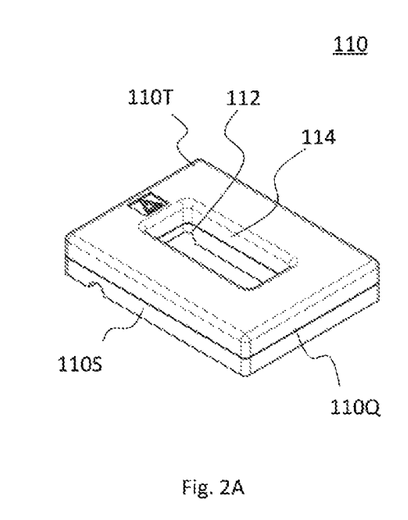
FIG. 2A shows a perspective top view of the first member in FIG. 1.
Figure 2B:
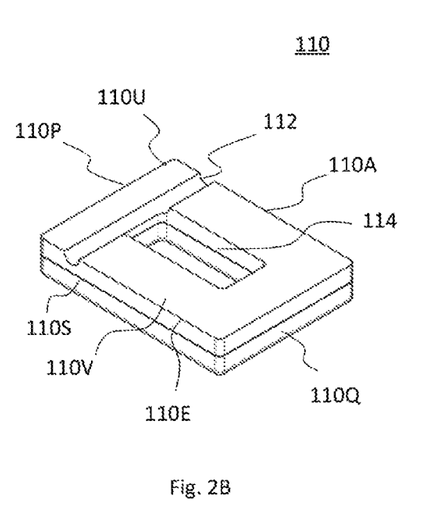
FIG. 2B shows a perspective bottom view of the first member in FIG. 1.

FIG. 2A shows a perspective top view and FIG. 2B shows a perspective bottom view of the first member 110 in FIG. 1. Referring to FIG. 2A, the first member 110 may have a top side 110T such that when the first member 110 is attached to the bucket 10, the top side 110T may be facing away from the bucket 10. As shown in FIG. 2B, the first member 110 may have the attaching side 110A opposite the top side 110T. First member 110 may have a proximal side 110P and a distal side 110Q opposite the proximal side 110P and a pair of parallel sides 110S extending from the proximal side 110P to the distal side 110Q. Proximal side 110P, the distal side 110Q and the pair of parallel sides 110S form a rectangular perimeter of the first member 110. First member 110 may be an oblong block. Attaching side 110A and the top side 110T may be in contact with the proximal side 110P, distal side 110Q, and the pair of parallel sides 110S. Plug channel 112 may extend linearly across the attaching side 110A and spaced from the proximal side 110P of the first member 110.

Accordingly, the plug channel 112 of the first member 110 may divide the attaching side 110A of the first member 110 into a first portion 110U and a second portion 110V.

First member 110 may have an opening 114 adapted to provide access to the plug channel 112 for the welding of the plug weld 118B. As shown in FIG. 1, the opening 114 may be a through hole that extends through the first member 110. Referring to FIG. 2A, the opening 114 may be a through hole that extends from the top side 110T to the attaching side 110A. Opening 114 may be in communication with the plug channel 112. As shown in FIG. 2A, it is possible to view a portion of the plug channel 112 in the opening 114. Opening 114 may have a rectangular profile and extend along the top side 110T in a direction from the proximal side 110P to the distal side 110Q. Opening 114 reduces the weight of the first member 110 which reduces the weight of the protected bucket 10 during its operation. While the plug channel 112 as shown in FIG. 2B has a semi-circular section, it is possible for the plug channel 112 to have a rectangular or triangular section. A semi-circular section is preferred as it reduces the strain in the first member 110.

Figure 3A:
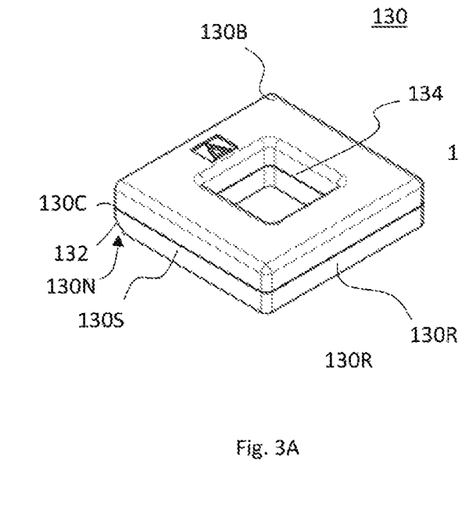
FIG. 3A shows a perspective top view of the second member in FIG. 1.
Figure 3B:
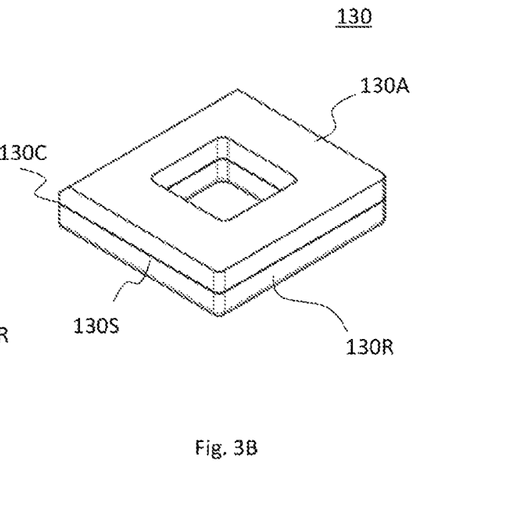
FIG. 3B shows a perspective bottom view of the second member in FIG. 1.

FIG. 3A shows a perspective top view and FIG. 3B shows a perspective bottom view of the second member 130 in FIG. 1. Referring to FIG. 3A, the second member 130 may have a top side 130T such that when the second member 130 is attached to the bucket 10, the top side 130T may be facing away from the bucket 10. As shown in FIG. 3B, the second member 130 may have an attaching side 130A opposite the top side 130T. Second member 130 may have a connecting side 130C, such that the connecting side 130C may be adapted to be connected to the attaching side 110A of the first member 110. As shown in FIG. 1, when the first member 110 and the second member 130 are connected to the bucket 10, the connecting side 130C may be connected to the attaching side 110A (not shown in FIG. 1) of the first member 110. Second member 130 may include a rear side 130R opposite the connecting side 130C and a pair of parallel sides 130S extending from the connecting side 130C to the rear side 130R. Connecting side 130C, the rear side 130R and the pair of parallel sides 130S may form a rectangular perimeter of the second member 130. Second member 130 may be an oblong. Attaching side 130A and the top side 130T may be in contact with the connecting side 130C, rear side 130R, and the pair of parallel sides 130S. Plug channel 132 of the second member 130 may be disposed at the intersection 130N of the attaching side 130A and the connecting side 130C of the second member 130. Plug channel 132 may extend linearly along the intersection 130N. Referring to FIG. 3A, the second member 130 may include a through hole 134 that extends from the top side 130T to the attaching side 130A. Through hole 134 may have a square profile and extend along the top side 130T in a direction from the connecting side 130C to the rear side 130R. While FIG. 3A and FIG. 3B shows the second member 130 having the through hole 134, it is possible that second member 130 has no through hole. For example, the first member 110 may have the opening 114 and the second member 130 does not have the through hole 134.

Figure 4:
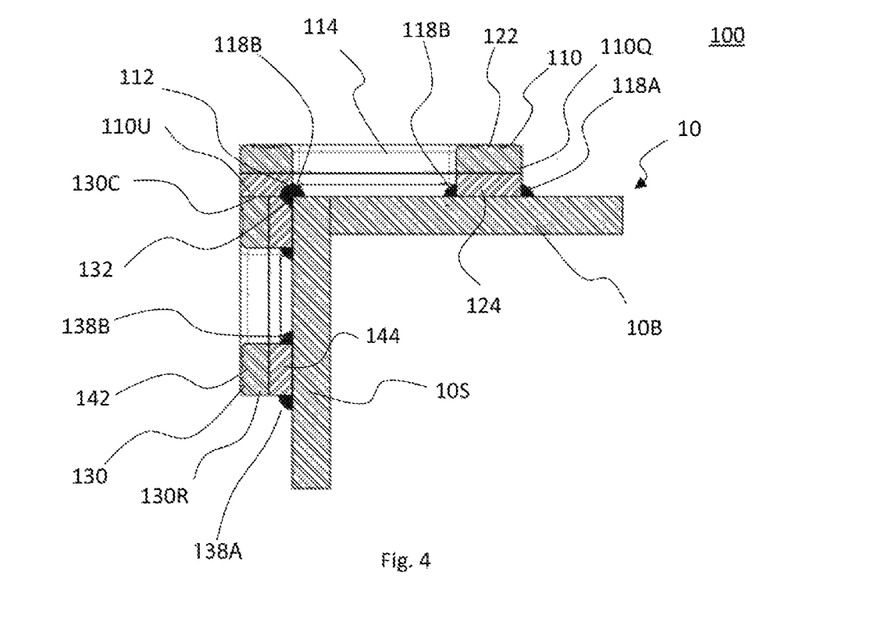
FIG. 4 shows a sectional view of the edge wear protector system in FIG. 1 mounted onto the N-type bucket.

FIG. 4 shows a sectional view of the edge wear protector system 100 mounted onto the N-type bucket 10. First member 110 may be mounted on the base plate 10B. First member 110 may be welded onto the base plate 10B by welding a plug weld 118A on the first member 110 and the base plate 10B and substantially around the external perimeter of first member 110, i.e. parallel sides 110S (not shown in FIG. 4) and distal side 110Q. In addition, a plug weld 118B may be welded on the first member 110 and the base plate 10B within the opening 114. As shown in FIG. 4, the plug weld 118B may be welded via the opening 114. Plug weld 118B may be received within the plug channel 112 of the first member 110. Plug channel 112 of the first member 110 may have a semi-circular section when viewed from one side of the first member 110. Plug channel 112 may have a quadrantal section at the junction where the plug channel 112 meets the opening 114 thus exposing the plug channel 112 within the opening 114 as shown in FIG. 4.

Second member 130 may be mounted onto the side plate 10S. Second member 130 may be welded onto the side plate 10S by welding a plug weld 138A on the second member 130 and the side plate 10S and substantially around the external perimeter of the second member 130, i.e. rear side 130R and parallel sides 130S. In addition, a plug weld 138B may be welded to the second member 130 and the side plate 10S via the through hole 134 of the second member 130. In the example of the second member 130 without the through hole 134, it would not be possible to do so. When the first member 110 is connected to the second member 130, the connecting side 130C of the second member 130 may be connected to the attaching side 110A of the first member 110. Connecting side 130C may be connected to the first portion 110U of the first member 110. Consequently, the plug channel 132 of the second member 130 may be aligned to be in communication with the plug channel 112 of the first member 110. As such, the plug weld 118B may also be received within the plug channel 132 of the second member 130. When the plug weld 118B is being welded onto the plug channel 112, the plug weld 118B may be received within the plug channel 132 of the second member 130 at the same time thereby securing the second member 130 to the first member 110 and consequently securing the first member 110 and the second member 130 to the bucket 10. By attaching the edge wear protector system 100 at the corner of the bucket 10, the edge wear protector system 100 is able to protect and prolong the lifespan of the bucket 10.

A plurality of the edge wear protector systems 100 may be installed along the length of the joint between the base plate 10B and the side plate 10S thereby increasing the strength of the joint. Further, the plug weld 118B welded to the first member 110, the second member 130 and the joint of the bucket 10 holds them together thus increasing the strength of the joint. Opening 114 in the first member 110 and the through hole 134 in the second member 130 provide more area for the plug welds to be welded onto the wear assembly 100 and the bucket 10 so as to enable a more secured attachment between them. The design of the edge wear protector system 100 provides maximal welding between the edge wear protector system 100 and the bucket 10. Conventional wear protectors allow only welding along the external perimeter of the protector. Edge wear protector system 100 allows welding to be made along the internal portions of the edge wear protector system 100, e.g. opening 114 and through hole 134. In addition, edge wear protector system 100 allows welding to be made at the corner joint of the bucket 10, between the edge wear protector system 100 and the bucket 10, to increase the adhering strength between the edge wear protector system 100 and the bucket 10. A welded joint, together with the perimeter welding, provides additional strength and stiffness to the bucket 10.

First member 110 may include an upper layer 122 and a lower layer 124 adapted to be connected to the base plate 10B. Upper layer 122 may be made of a material harder than the material of the lower layer 124. Upper layer 122 which would be exposed to the ground during the operation of the bucket 10 may need to be made from a hard material. e.g.

cast steel alloy. Lower layer 124 which would be protected by the upper layer 122 and welded may need to be made from a softer material, e.g. mild steel alloy. As shown in FIG. 4, the second member 130 may include an outer layer 142 and an inner layer 144 adapted to be connected to the side plate 10S. Outer layer 142 may be made from a material harder than the material of the inner layer 144. Outer layer 142 of the second member 130, although does not undergo the same wear as the first member 110, the second member 130 may still be subject to a considerable amount of wear. Therefore, the outer layer 142 may be made from a harder material, e.g. cast steel alloy, and the inner layer 144 may be made from a softer material, e.g. mild steel alloy. As the upper layer 122 is able to withstand higher wear, the first member 110 may be made to protrude out from the bucket 10 to cover the connecting edge 130C of the second member 130. As shown in FIG. 4, the connecting edge 130C which comprises an end of the outer layer 142 and the inner layer 144 may be exposed to the ground when the bucket 10 is in operation if it is not covered. In this situation, when the bucket 10 is engaging the ground, the inner layer 144 may be subjected to wearing. As the inner layer 144 is softer than the outer layer 142, the inner layer 144 may wear off faster than the outer layer 142. Therefore, by covering the connecting side 130C of the second member 130, the first member 110 may prevent the second member 130 from pre-mature wearing. The same arrangement may be applicable for all the subsequent examples of the edge wear protector system. The use of dual material arrangement allows the weight of the edge wear protector system to be minimised. Typically, in order to obtain a durable edge wear protector system, conventional wear protectors are made from a single hard material. Edge wear protector system 100 allows a softer and lighter material to be used, replacing a portion of the hard material, thereby reducing the weight of the edge wear protector system 100. A lighter bucket 10 reduces fatigue on the associated structural components connected to the bucket 10. Furthermore, additional payload may be allowed due to the reduced weight of the bucket 10. In addition, the combination of material allows the edge wear protector system 100 to have a lower profile than a conventional protector. A lower profiled edge wear protector system 100 reduces friction and drag on the bucket 10 during operation. By having a softer material on the attaching sides 110A, 130A of the edge wear protector system 100, e.g. low alloy steel, higher quality welding can be achieved between the edge wear protector system 100 and the bucket 10 more easily. However, it is possible for first member 110 and the second member 130 to be switched such that the first member 110 may be attached to the side plate 10S and the second member 130 may be attached to the base plate 10B.

Figure 5:
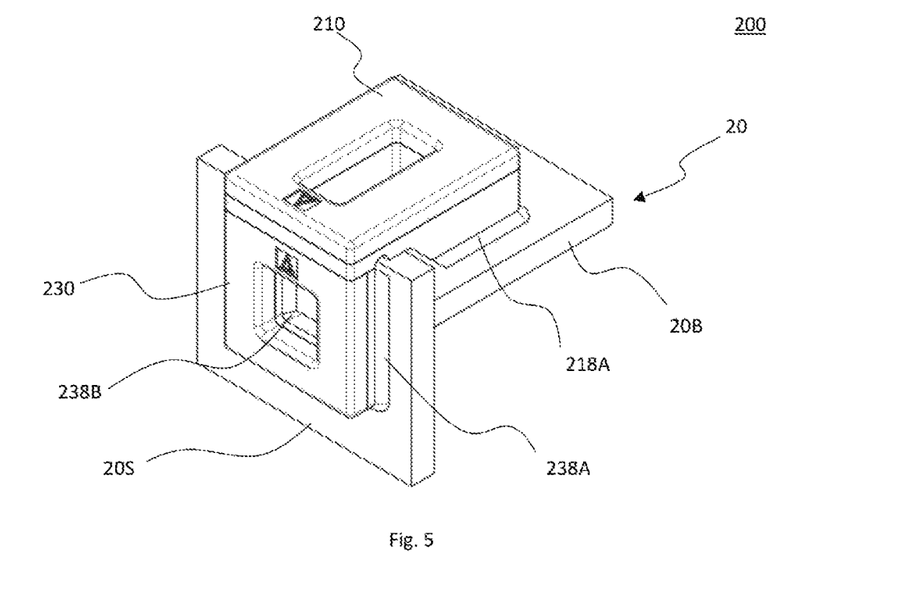
FIG. 5 shows an example of the edge wear protector system attachable to the bucket.

FIG. 5 shows an example of the edge wear protector system 20X) attachable to the bucket 20. Similar to the example in FIG. 1, the edge wear protector system 200 may include a first member 210 attachable to the base plate 20B and a second member 230 attachable to the side plate 20S. As shown in FIG. 5, the bucket 20 is a H-type bucket 10 which differs from the N-type bucket 10 as shown in FIG. 1 such that the side plate 20S protrudes from the base plate 20B vertically. First member 210 and the second member 230 may be welded to the bucket 20. As shown in FIG. 5, the first member 210 may be welded to the base plate 20B by welding the plug weld 218A to the first member 210 and the base plate 20B and the second member 230 may be welded to the side plate 20S by welding the plug weld 238A to the second member 230 and the side plate 20S. Plug weld 238B may be welded to the second member 230 and the side plate 20S via the through hole 234.

Figure 6A:
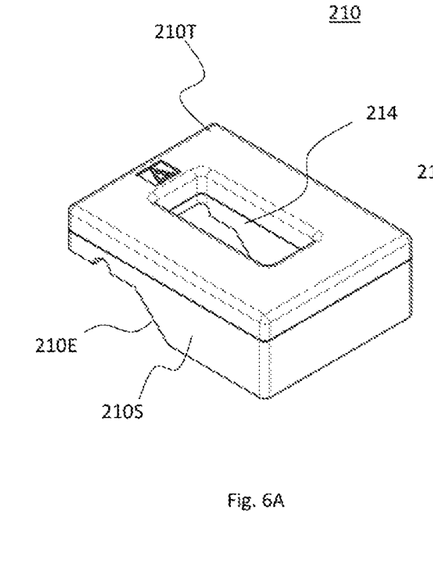
FIG. 6A shows a perspective top view of the first member in FIG. 5.
Figure 6B:
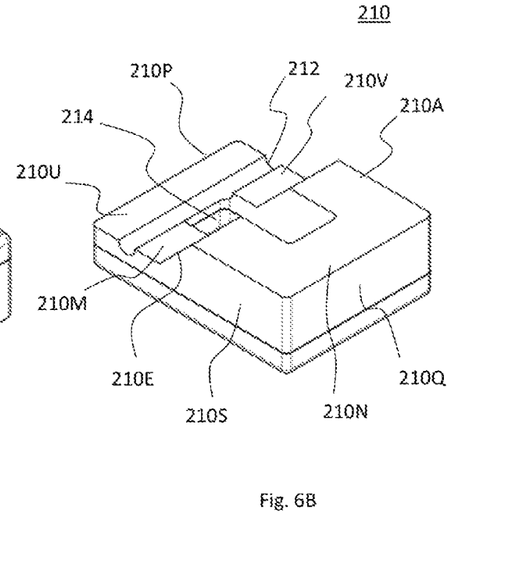
FIG. 6B shows a perspective bottom view of the first member in FIG. 5.

FIG. 6A shows a perspective top view and FIG. 6B shows a perspective bottom view of the first member 210 in FIG. 5. Referring to FIG. 6A, the first member 210 may have a top side 210T such that when the first member 210 is attached to the base plate 20B, the top side 210T may be facing away from the base plate 20B. Referring to FIG. 6B, the first member 210 may have an attaching side 210A adapted to be in contact with the base plate 20B when the first member 210 is attached to the bucket 20. First member 210 may have a proximal side 210P and a distal side 210Q opposite the proximal side 210P and a pair of parallel sides 210S extending from the proximal side 210P to the distal side 210Q. Proximal side 210P, the distal side 210Q and the pair of parallel sides 210S form a rectangular perimeter of the first member 210. Attaching side 210A and the top side 210T may extend from the proximal side 210P to the distal side 210Q of the first member 210. Attaching side 210A of the first member 210 may include a step 210E dividing the attaching side 210A into a proximal portion 210M adapted to be connected to the second member 230 and a distal portion 210N adapted to be connected to the base plate 20B. As shown in FIG. 6B, the first member 210 may include a plug channel 212. Plug channel 212 of the first member 210 may be disposed at the proximal portion 210M of the attaching side 210A of the first member 210. Plug channel 212 may extend linearly across the proximal portion 210M and spaced from the proximal side 210P of the first member 210. Plug channel 212 may divide the proximal portion 210M into a first portion 210U and a second portion 210V. First member 210 may include an opening 214 on the attaching side 210A of the first member 210. Opening 214 may extend from the top side 210T to the attaching side 210A. Opening 214 may be connected to the plug channel 212 thereby providing welding access to the plug channel 212.

Figure 7:
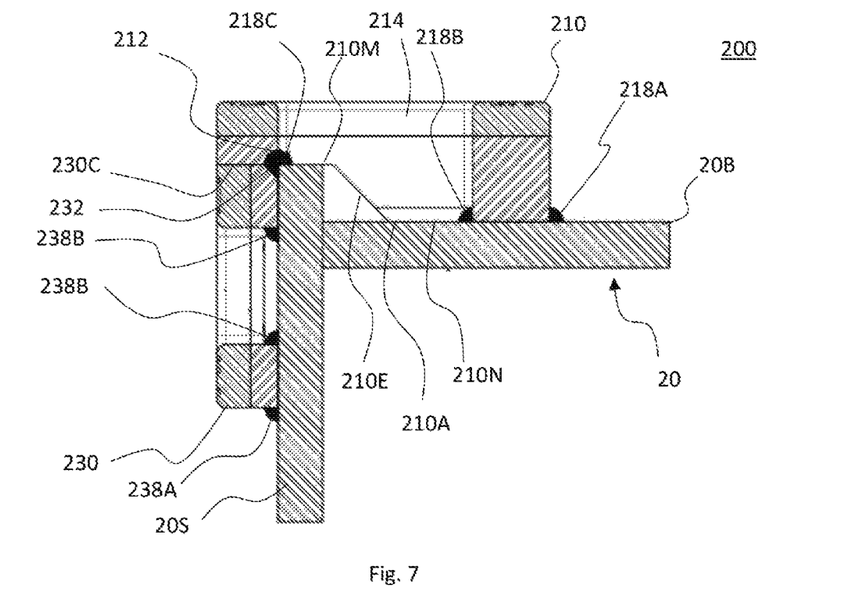
FIG. 7 shows a sectional view of the edge wear protector system in FIG. 5 being attached to the H-type bucket.

FIG. 7 shows a sectional view of the edge wear protector system 200 in FIG. 5 being attached to the H-type bucket 20. First member 210 may be attached to the base plate 20B. First member may protrude out of the side plate 20S to connect to the second member 230. As shown in FIG. 7, there is a step-up from the base plate 20B to the side plate 20S. Step 210E of the first member 210 may be adapted to accommodate such a step-up bucket joint. Step 210E may be a slope connected between the distal portion 210N and the proximal portion 210M. Distal portion 210N may be attached to the base plate 20B and the proximal portion 210M may be attached to the second member 230. As shown in FIG. 7, the proximal portion 210M may be at a different plane from the distal portion 210N, e.g. the proximal portion 210M may be further away from the base plate 20B then the distal portion 210N. Second member 230 may be the same as the second member 130 as shown in FIG. 1. When the connecting side 230C of the second member 230 connects to the attaching side 210A of the first member 210, the plug channel 232 of the second member 230 may be connected to the plug channel 212 of the first member 210. Distal portion 210N of the first member 210 may be attached to the base plate 20B via a plug weld 218A. Plug weld 218A may be welded substantially around the perimeter of the distal portion 210N and on the base plate 20B. In addition, a plug weld 218B may be welded to the distal portion 210N and the base plate 20B within the opening 214. As shown in FIG. 7, the plug weld 218B may be welded by accessing the plug channel 212 via the opening 214. Proximal portion 210M may be attached to the second member 230 by welding a plug weld 218C into the plug channel 212. Second member 230 may be welded onto the side plate 20S by welding a plug weld 238A on the second member 230 and the side plate 20S. Plug weld 238A may be welded substantially around the external perimeter of the second member 230. When the first member 210 is connected to the second member 230, the connecting side 230C of the second member 230 is connected to the proximal portion 210M of the attaching side 210A of the first member 210. Connecting portion 230C may be connected to the first portion 210U of the first member 210. Consequently, the plug channel 232 of the second member 230 may be aligned to be in communication with the plug channel 212 of the first member 210. As such, the plug weld 218C may be received within the plug channel 232 of the second member 230. When the plug weld 218C is being welded onto the plug channel 212, the plug weld 218C may be received within the plug channel 232 of the second member 230 at the same time thereby securing the second member 230 to the first member 210 and consequently securing the first member 210 and the second member 230 to the joint of the bucket 20.

Figure 8:
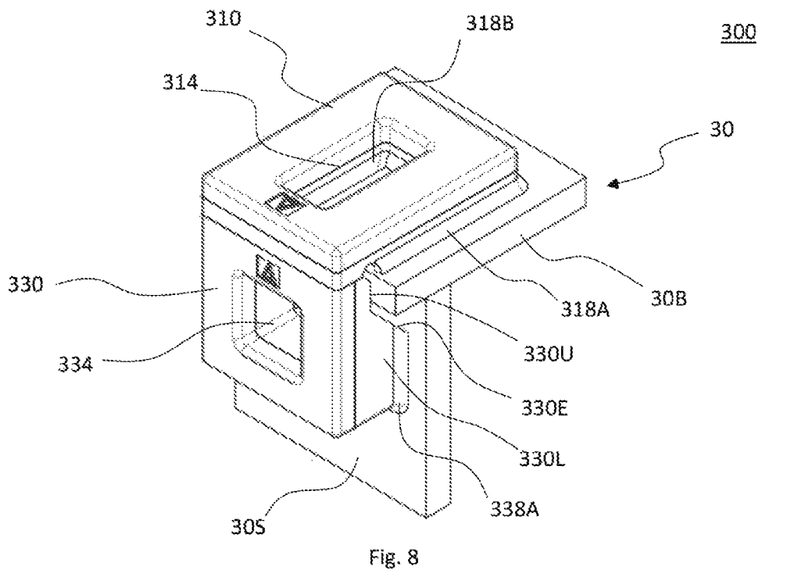
FIG. 8 shows an example of the edge wear protector system attachable to the bucket.

FIG. 8 shows an example of the edge wear protector system 300 attachable to the bucket 30. Unlike the previous examples, the bucket 30 as shown in FIG. 8 is a T-typed bucket 30 where the base plate 30B exceeds the side plate 30S forming a "T". Edge wear protector system 300 may have a first member 310 like the first member 110 in FIG. 1 attached to the base plate 30B and a second member 330 attached to the side plate 30S. As shown in FIG. 8, the T-shaped joint forms a step between the base plate 30B and the side plate 30S. Accordingly, the attaching side (not shown in FIG. 8) of the second member 330 may have a step 330E dividing the attaching side into an upper portion 330U and a lower portion 330L, such that the lower portion 330L is adapted to be connected to the side plate 30S. As shown in FIG. 8, the first member 310 may be welded to the base plate 30B by welding the plug weld 318A to the first member 310 and the base plate 30B and the second member 330 may be welded to the side plate 30S by welding the plug weld 338A to the second member 330 and the side plate 30S. Plug weld 318B may be welded to the first member 310 and the base plate 30B via the opening 314. Plug weld 338B (not shown in FIG. 8) may be welded to the second member 330 and the side plate 30S via the through hole 334.

Figure 9A:
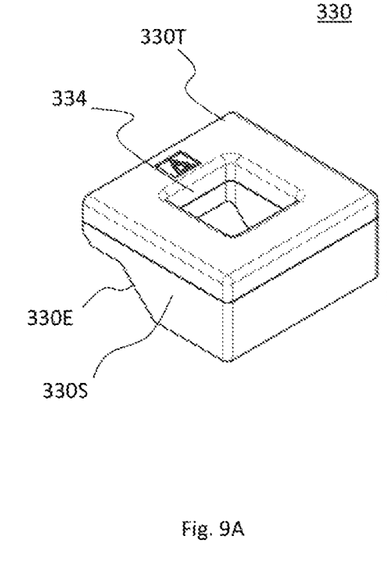
FIG. 9A shows a perspective top view of the second member in FIG. 8.
Figure 9B:
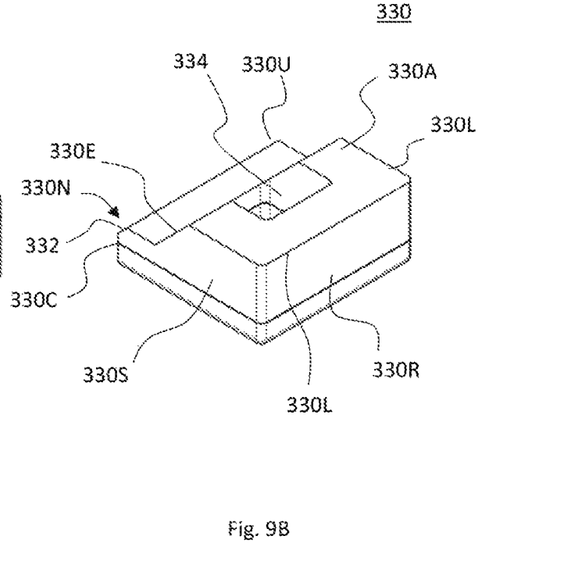
FIG. 9B shows a perspective bottom view of the second member in FIG. 8.

FIG. 9A shows a perspective top view and FIG. 9B shows a perspective bottom view of the second member 330 in FIG. 8. Referring to FIG. 9A, the second member 330 may have a top side 330T such that when the first member 310 is attached to the bucket 30, the top side 330T may be facing away from the bucket 30. Referring to FIG. 9B, the second member 330 may have an attaching side 330A adapted to be in contact with the base plate 30B when the second member 330 is attached to the bucket 30. Second member 330 may have a connecting side 330C and a rear side 330R opposite the connecting side 330C and a pair of parallel sides 330S extending from the connecting side 330C to the rear side 330R. Connecting side 330C, the rear side 330R and the pair of parallel sides 330S form a rectangular perimeter of the first member 310. Attaching side 330A may extend from the connecting side 330C to the rear side 330R of the second member 330. Attaching side 330A of the second member 330 may include a step 330E dividing the attaching side 330A into the upper portion 330U adapted to be connected to the first member 310 and a lower portion 330L adapted to be connected to the side plate 20S. As shown in FIG. 9A, the second member 330 may include a plug channel 332. Plug channel 332 of the second member 330 may be disposed at the upper portion 330U of the attaching side 330A of the second member 330. Plug channel 332 of the second member 330 may be disposed at the intersection 330N of the attaching side 330A and the connecting side 330C of the second member 330. Plug channel 332 may extend linearly across the intersection 130N. Plug channel 332 may be a chamfer formed between the connecting side 330C and the upper portion 330U of the second member 330. Second member 330 may include a through hole 334 extending from the top side 330T to the attaching side 330A of the second member 310.

Figure 10:
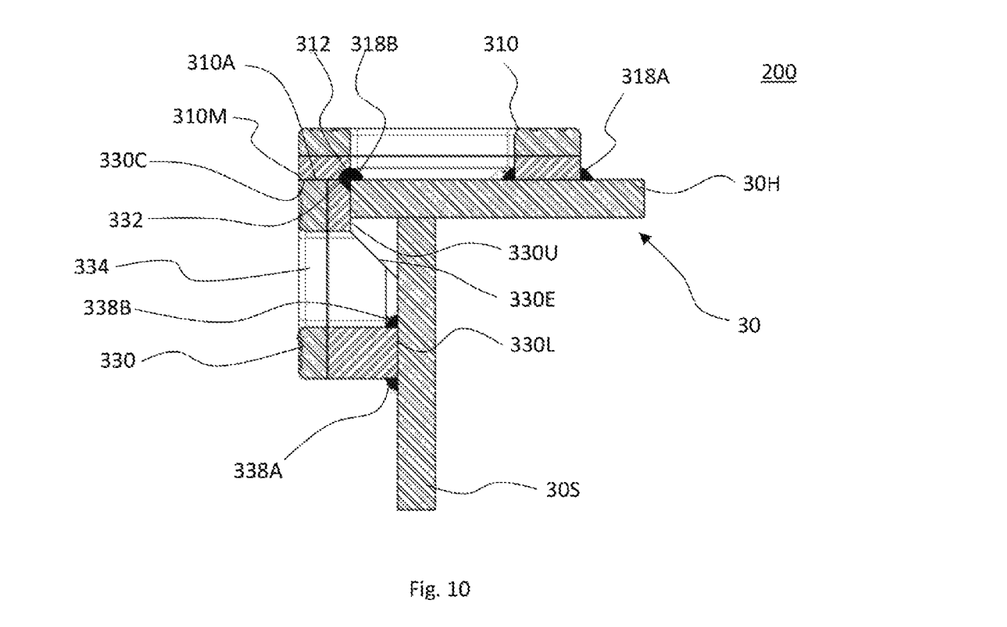
FIG. 10 shows a sectional view of the edge wear protector system in FIG. 8 being attached to the T-type bucket.

FIG. 10 shows a sectional view of the edge wear protector system 300 in FIG. 8 being attached to the T-type bucket 30. First member 310 may be attached to the base plate 30B. First member 310 may protrude out of the base plate 30B to connect to the second member 330. In this way, like the previous examples, the plug channel 312 of the first member 310 may be exposed to be connected to the plug channel 332 of the second member 330. As shown in FIG. 10, there is a step-up from the side plate 20S to the end of the base plate 20B. Step 330E of the second member 330 may be adapted to accommodate such a step-up. Step 330E may be a slope connecting the upper portion 330U and the lower portion 330L. Lower portion 330L may be attached to the side plate 30S and the upper portion 330U may be attached to the first member 310. As shown in FIG. 10, the upper portion 330U may be at a different plane from the lower portion 330L, e.g. the upper portion 330U may be further away from the side plate 30S then the lower portion 330L. When the connecting side 330C of the second member 330 connects to the attaching side 310A of the first member 310, the plug channel 332 of the second member 330 may be connected to the plug channel 312 of the first member 310. Lower portion 330L of the second member 330 may be attached to the side plate 30S via a plug weld 338A. Plug weld 338A may be welded substantially around the perimeter of the lower portion 330L and on the side plate 30S. In addition, a plug weld 338B may be welded on the lower portion 330L and the side plate 30H within the through hole 334. As shown in FIG. 10, the plug weld 338B may be welded via the through hole 334. First member 310 may be attached to the second member 330 by welding a plug weld 318B into the plug channel 312 and plug channel 332. When the second member 330 is connected to the first member 310, the connecting side 330C of the second member 330 is connected to the attaching side 310A of the first member 310. Connecting side 330C may be attached to the proximal portion 310M of the first member 310. Consequently, the plug channel 332 of the second member 330 may be aligned to be in communication with the plug channel 312 of the first member 310. As such, the plug weld 318B may be received within the plug channel 332 of the second member 330. When the plug weld 318B is being welded onto the plug channel 312 of the first member 310, the plug weld 318B may be received within the plug channel 332 of the second member 330 at the same time thereby securing the second member 330 to the first member 310 and consequently securing the first member 310 and the second member 330 to the joint of the bucket 30.

Figures 11A, 11B:
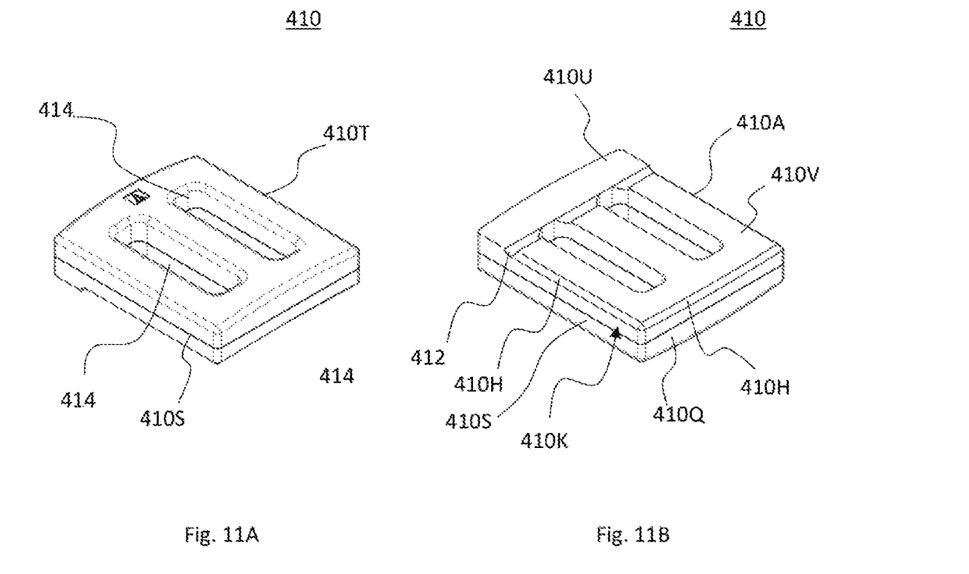
FIG. 11A shows the perspective top view of an example of the first member.
FIG. 11B shows the perspective bottom view of an example of the first member.

FIG. 11A and FIG. 11B show an example of the first member 410. FIG. 11A shows the perspective top view and FIG. 11B shows the perspective bottom view of the first member 410. Referring to FIG. 11A the first member 410 may include one or more openings 414, e.g. two openings 414. Further, the first member 410 may have a convexly arcuated top side 410T. As mentioned earlier, as shown in FIG. 4B, each of the openings 414 may be connected to the plug channel 412 such that the plug weld 418B may be welded into the plug channel 412 via the openings 414. Plug channel 412 of the first member 410 may divide the attaching side 410A of the first member 410 into a first portion 410U and a second portion 410V. First member 410 may include an edge 410K surrounding the second portion 410V and a plug duct 410H disposed along the edge 410K of the second portion 410V, such that the plug duct 410H may be adapted to receive a plug weld (not shown in FIG. 11B) therein. Plug duct 410H may protect the plug weld from external forces and thereby increasing the durability of the plug weld. Plug channel 412 may be connected to or in communication with the plug duct 410H such that the plug weld (not shown in FIG. 11B) may be welded substantially around the second portion 410V. Plug duct 410H may be a chamfer formed between the parallel sides 410S, distal side 410Q and the second portion 410V. Attaching side 410A may be concavely arcuated to accommodate base plates with curved surfaces.

Figure 12A:
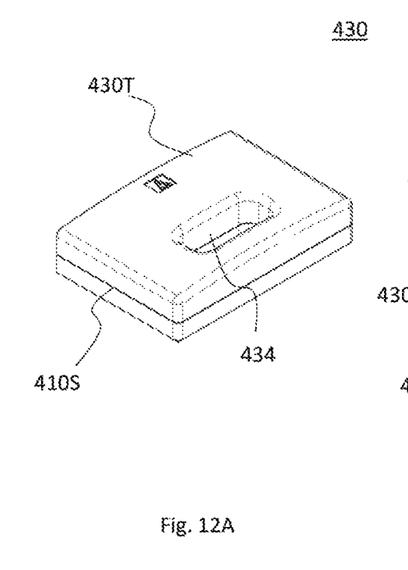
FIG. 12A shows the perspective top view of an example of the second member.
Figure 12B:
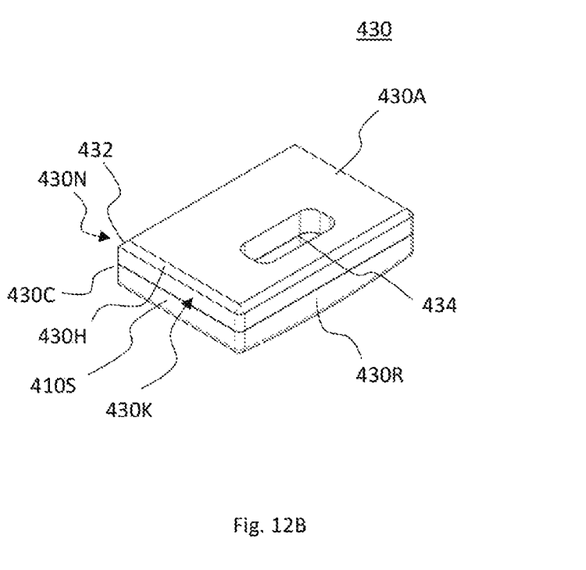
FIG. 12B shows the perspective bottom view of an example of the second member.

FIG. 12A and FIG. 12B show an example of the second member 430. FIG. 12A shows the perspective top view and FIG. 12B shows the perspective bottom view of the second member 430. Referring to FIG. 12A, the second member 430 may have a convexly arcuated top side 430T. Referring to FIG. 12B, the second member 430 may include the attaching side 430A and the connecting side 430C and the plug channel 432 may be disposed along the intersection 430N between the attaching side 430A and the connecting side 430C. Second member 430 may include an edge 430K surrounding the attaching side 430A and a plug duct 430H extending along the edge 430K. Plug channel 432 may be connected to or in communication with the plug duct 430H such that the plug weld (not shown in FIG. 12B) may be welded substantially around the attaching side 430A. Plug duct 430H may be a chamfer formed between the parallel sides 410S, rear side 430R and the attaching side 430A. As mentioned earlier, the plug duct 430H protects the plug weld from damage. Plug duct is applicable to all the edges of all the attaching surfaces of the first member and second member to protect the plug ducts. Second member 430 may include one or more through holes 434 extending from the top side 430T to the attaching side 430A.

Figure 13A:
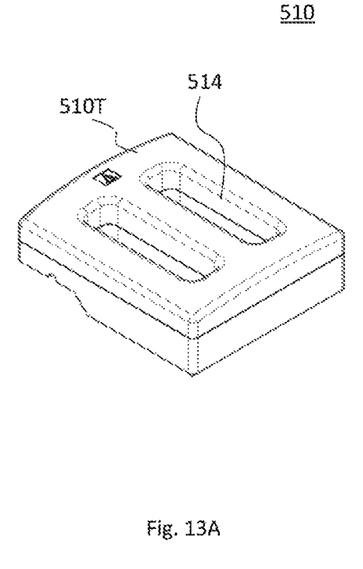
FIG. 13A shows the perspective top view of an example of the first member.
Figure 13B:
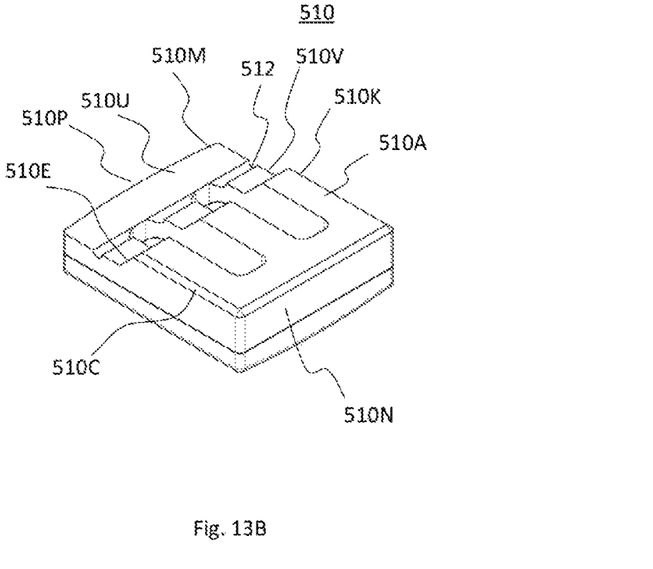
FIG. 13B shows the perspective bottom view of an example of the first member.

FIG. 13A and FIG. 13B show an example of the first member 510. FIG. 13A shows the perspective top view and FIG. 13B shows the perspective bottom view of the first member 510. Referring to FIG. 13A, the first member 510 may include one or more openings 514, e.g. two openings 514. First member 510 may include the top side 510T. Openings 514 may extend from the top side 510T to the attaching side 510A. Referring to FIG. 13B, the attaching side 510A of the first member 510 may include the step 510E dividing the attaching side 510A into the proximal portion 510M adapted to be connected to the second member (not shown in FIG. 13B) and the distal portion 510N adapted to be connected to the base plate (not shown in FIG. 13B). First member 510 may include the plug channel 512 extending across the attaching side 510A. Plug channel 512 of the first member 510 may be disposed at the proximal portion 510M of the attaching side 510A of the first member 510. Plug channel 512 may extend across the proximal portion 510M of the first member 510 and spaced from the proximal side 510P of the first member 510. Plug channel 512 of the first member 510 may divide the proximal portion 510M of the first member 510 into the first portion 510U and the second portion 510V. First member 510 may include an edge 510E surrounding the distal portion 510N and a plug duct 510H disposed along the edge of the distal portion 510N. Plug duct 510H may be adapted to receive a plug weld therein.

Figures 14A, 14B:
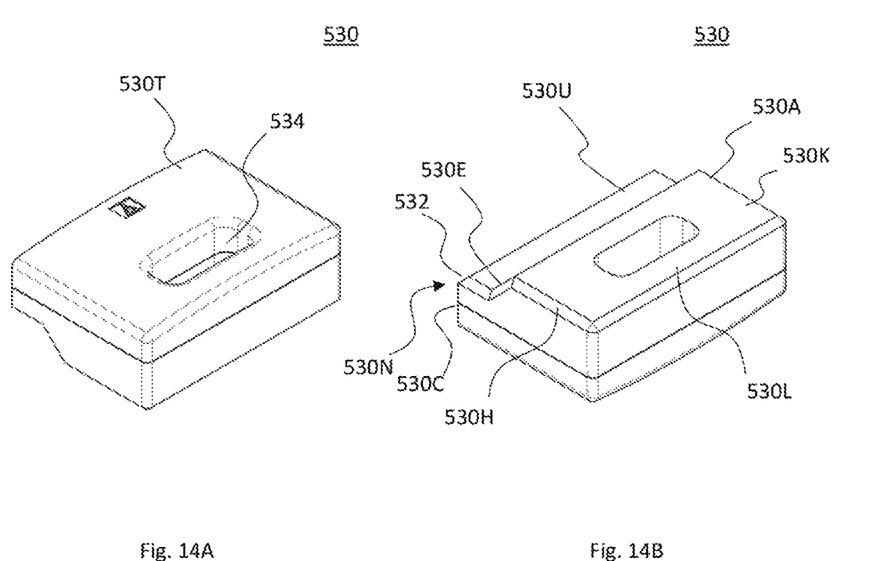
FIG. 14A shows the perspective top view of an example of the second member.
FIG. 14B shows the perspective bottom view of an example of the second member.

FIG. 14A and FIG. 14B show an example of the second member 530. FIG. 14A shows the perspective top view and FIG. 14B shows the perspective bottom view of the second member 530. Referring to FIG. 14A, the second member 530 may include the top side 530T. Second member 530 may include the through hole 534 extending from the top side 530T to the attaching side 530A. However, the second member 530 may include more than one through holes 534. Referring to FIG. 14B, the attaching side 530A of the second member 530 may include the step 530E dividing the attaching side 530A into the upper portion 530U adapted to be connected to the first member (not shown in FIG. 6B) and a lower portion 530L adapted to be connected to the side plate (not shown in FIG. 6B). Second member 530 may include the edge 530K surrounding the lower portion 530L and a plug duct 530H disposed along the edge 530K of the lower portion 530L. Plug duct 530H may be adapted to receive a plug weld therein. Similar to the earlier examples, the second member 530 may include the plug channel 532 along the intersection 530N between the upper portion 530U and the connecting side 530C. Plug channel 532 and the plug duct 530H may be chamfers as described above.

Figure 15:
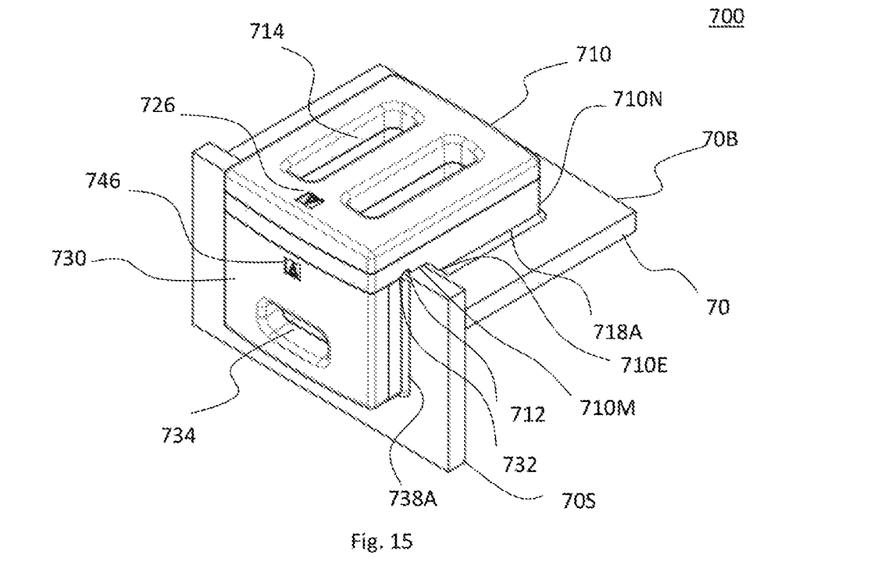
FIG. 15 shows an example of the edge wear protector system attached to a bucket.

FIG. 15 shows an example of the edge wear protector system 700 attached to a bucket 70. First member 710 of the edge wear protector system 700 may have the step 710E. First member 710 of the edge wear protector system 700 may be welded to the base plate 70B at the distal portion 710N by welding plug weld 718A to the first member 710 and the base plate 70B. While it is not shown in FIG. 15, the plug weld 718C is welded into the plug channel 712 through the opening 714. Proximal portion 710M of the first member 710 may be protruded beyond the side plate 70S sufficiently to cover with the second member 730. Second member 730 may be welded to the side plate 70S by welding plug weld 738A to the second member 730 and the side plate 70S. While it is not shown in FIG. 15, the plug weld 738C is welded to the second member 730 and the side plate 70S through the through hole 734. As mentioned earlier, the plug weld 718C may be disposed in the plug channel 712 of the first member 710 and the plug channel 732 of the second member 730 and welded to the corner of the bucket 70.

Referring to FIG. 15, the first member 710 and the second member 730 may each have a marker 726,746 disposed adjacent the proximal side 710P of the first member 710 and the connecting side 730C of the second member 730 respectively. When installing the first member 710 and the second member 730, the markers 726,246 may be aligned to meet each other to ensure that second member 730 is aligned to the first member 710. Markers may be included in all preceding examples.

Figure 16:
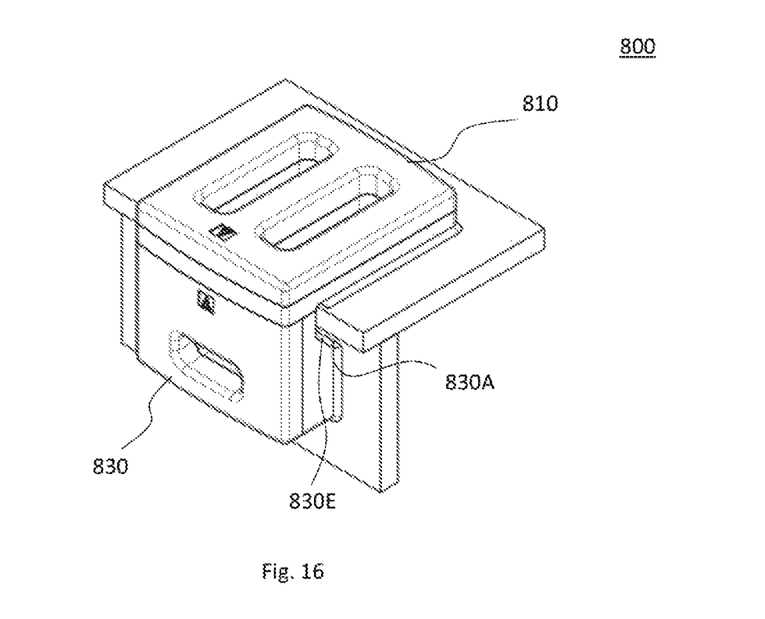
FIG. 16 shows an example of the edge wear protector system.

FIG. 16 shows an example of the edge wear protector system 800. Edge wear protector system 800 is similar to the edge wear protector system 700 in FIG. 15 except that the first member 810 does not include a step on the attaching side 810A of the first member 810 and the second member 830 has the step 830E on the attaching side 830A of the second member 830.

As shown above, the edge wear protector system provides a variety of combinations between the first member and the second member to accommodate to buckets of various joint types. Examples above show the first member connected to the second member when the edge wear protector system is installed onto the bucket. First member may also be connected to the second member via a connecting member. For example, the first member may not include the first portion and therefore does not protrude from the bucket but is aligned to the end of the base plate. In such a configuration, the plug channel of the first member and the plug channel of the second channel may be aligned along the corner of the bucket and connected to each other. Plug weld may be welded into the plug channels of the respective members and on the joint. Thereafter, the connecting member may be welded between the first member and the second member to protect the second member.

A skilled person would appreciate that the features described in one example may not be restricted to that example and may be combined with any one of the other examples.

The invention claimed is:

1. An edge wear protector system adapted to be attached to a bucket of earth moving equipment, the bucket comprising a base plate and a side plate connected to the base plate, the edge wear protector system comprising:
    a first member attachable to the base plate, the first member comprising an attaching side adapted to connect to the base plate when the first member is attached to the base plate, a proximal side and a distal side opposite the proximal side, wherein the first member comprises a plug channel adapted to receive a plug weld therein and the plug channel of the first member extends linearly across the attaching side of the first member and spaced parallelly from the proximal side of the first member, wherein the first member comprises an opening adapted to provide access to the plug channel of the first member for welding of the plug weld of the first member;
    a second member attachable to the side plate, the second member comprising an attaching side adapted to connect to the side plate when the second member is attached to the side plate, and a connecting side at an end of the second member, wherein the connecting side is adapted to be connected to the attaching side of the first member, wherein the second member comprises a plug channel adapted to receive a plug weld therein and the plug channel of the second member extends linearly along the intersection of the attaching side of the second member and the connecting side of the second member; and
    wherein the first member is connectable to the second member and the plug channel of the first member is connected to the plug channel of the second member, wherein, the plug weld, when welded to the plug channel of the second member is adapted to secure the second member to the first member and both the first member and the second member to the bucket.

2. The edge wear protector system of claim 1, wherein the opening comprises a through hole.

3. The edge wear protector system of claim 1, wherein the attaching side of the first member comprises a step dividing the attaching side of the first member into a proximal portion adapted to be connected to the second member and a distal portion adapted to be connected to the base plate.

4. The edge wear protector system of claim 3, wherein the plug channel of the first member is disposed at the proximal portion of the attaching side of the first member.

5. The edge wear protector system of claim 3, wherein the first member comprises an edge surrounding the distal portion and a plug duct disposed along the edge of the distal portion of the first member, wherein the plug duct of the first member is adapted to receive a plug weld therein.

6. The edge wear protector system of claim 1, wherein the plug channel of the first member divides the attaching side of the first member into a first portion and a second portion, wherein the first member comprises an edge surrounding the second portion and a plug duct disposed along the edge of the second portion of the first member, wherein the plug duct of the first member is adapted to receive a plug weld therein.

7. The edge wear protector system of claim 1, wherein the attaching side of the second member comprises a step dividing the attaching side of the second member into an upper portion adapted to be connected to the first member and a lower portion adapted to be connected to the side plate.

8. The edge wear protector system of claim 7, wherein the second member comprises an edge surrounding the lower portion and a plug duct disposed along the edge of the lower portion of the second member, wherein the plug duct of the second member is adapted to receive a plug weld therein.

9. The edge wear protector system of claim 1, wherein the first member comprises an upper layer and a lower layer adapted to be connected to the base plate, wherein the upper layer is made from a material harder than a material of the lower layer.

10. The edge wear protector system of claim 1, wherein the second member comprises an outer layer and an inner layer adapted to be connected to the side plate, wherein the outer layer is made from a material harder than a material of the inner layer.

* * * * *